US006508455B2

(12) United States Patent
Rauch et al.

(10) Patent No.: US 6,508,455 B2
(45) Date of Patent: Jan. 21, 2003

(54) ELECTRONIC THROTTLE BODY GEAR TRAIN MODULE

(75) Inventors: James Richard Rauch, Grass Lake, MI (US); John Joseph Fiorini, Brighton, MI (US); Bob Forbes, Whitmore Lake, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/750,730

(22) Filed: Dec. 28, 2000

(65) Prior Publication Data

US 2002/0084436 A1 Jul. 4, 2002

(51) Int. Cl.[7] .................................................. F16K 1/22
(52) U.S. Cl. ....................................... 251/305; 251/367
(58) Field of Search ................................. 251/305, 367

(56) References Cited

U.S. PATENT DOCUMENTS

| | | | | | |
|---|---|---|---|---|---|
| 2,134,889 | A | | 11/1938 | Phillips et al. | |
| 4,161,994 | A | | 7/1979 | Collonia | |
| 4,523,564 | A | | 6/1985 | Sturdy | |
| 4,809,659 | A | | 3/1989 | Tamaki et al. | |
| 5,119,899 | A | * | 6/1992 | Johnson et al. | 180/177 |
| 5,396,870 | A | | 3/1995 | Beale | |
| 5,423,299 | A | * | 6/1995 | Kumagai | 123/399 |
| 5,666,988 | A | * | 9/1997 | Becker | 137/15.18 |
| 5,749,336 | A | * | 5/1998 | Tamaki et al. | 123/337 |
| 5,979,871 | A | * | 11/1999 | Forbes et al. | 123/337 |
| 6,067,958 | A | * | 5/2000 | Kamimura et al. | 123/337 |
| 6,095,488 | A | * | 8/2000 | Semeyn et al. | 185/40 R |
| 6,119,652 | A | * | 9/2000 | Waples et al. | 123/337 |
| 6,123,318 | A | * | 9/2000 | Forbes et al. | 251/173 |
| 6,173,939 | B1 | * | 1/2001 | Dottavio et al. | 123/339.15 |
| 6,189,506 | B1 | * | 2/2001 | Vanderveen | 123/337 |
| 6,244,565 | B1 | * | 6/2001 | McDonnell et al. | 251/129.12 |
| 6,253,732 | B1 | * | 7/2001 | Semeyn et al. | 123/396 |
| 6,267,352 | B1 | * | 7/2001 | Semeyn et al. | 123/339.15 |
| 6,293,095 | B1 | * | 9/2001 | Yamamoto et al. | 60/272 |
| 6,295,968 | B2 | * | 10/2001 | Torii et al. | 123/337 |
| 6,347,613 | B1 | * | 2/2002 | Rauch | 123/337 |
| 6,352,241 | B1 | * | 3/2002 | Hannewald et al. | 251/129.11 |
| 6,364,284 | B1 | * | 4/2002 | Imada et al. | 251/248 |

* cited by examiner

*Primary Examiner*—Henry C. Yuen
*Assistant Examiner*—David A Bonderer
(74) *Attorney, Agent, or Firm*—John E. Kajander

(57) ABSTRACT

A modular electronic throttle valve system for an internal combustion engine. A modular subassembly including at least a housing, motor, gear train and electronic sensors are mated with a two-piece air passageway subassembly. Bearings on the throttle shaft hold the throttle shaft in position in the clamshell member. A throttle shaft and throttle valve plate are either positioned in the modular subassembly with the housing, motor, gear train and electronic sensors, or included in the clamshell subassembly with a coupling member. The clamshell member and modular housing are secured together to form the completed electronic throttle control mechanism.

7 Claims, 5 Drawing Sheets

ELECTRONIC THROTTLE BODY GEAR TRAIN MODULE

TECHNICAL FIELD

The present invention relates to electronic throttle systems for internal combustion engines, and more particularly to an electronic throttle mechanisms having modular construction.

BACKGROUND OF THE INVENTION

There is an interest today in the automotive industry to use more components made of a plastic material. Plastic components are lighter in weight than metal components and are generally more corrosion resistant. Further, plastic molding techniques minimize machining requirements and reduce the number of parts for various assemblies and systems.

One of the areas in which plastic components are being utilized relates to electronic and throttle valve systems. These systems generally include two-part housing members, including a base member and a cover member. Often, a portion of the intake passageway is included as part of the housing mechanism which also includes a throttle shaft, gear train, and throttle valve plate. Such electronic throttle assemblies are then installed in a vehicle in the air passageway system. These systems are more expensive and do not allow changes in some of the components without considerable difficulty and/or expense.

Thus, a need exists for a modular-type electronic throttle body system or assembly which utilizes plastic components where possible, contains modular components and thus is easy to assemble and install, and is versatile and allows use of many of the components for various vehicles and systems.

SUMMARY OF THE INVENTION

It is an object of the present invention to provide an improved electronic throttle valve system. It is another object of the present invention to provide an improved modular-type electronic throttle valve system.

It is a further object of the present invention to provide an electronic throttle assembly which utilizes as many plastic components and parts as possible. It is a still further object of the present invention to provide an electronic throttle system which is made of modular components and allows versatility in the use of some of the components for various vehicles.

In accordance with these objects, the present invention provides a modular-type electronic throttle valve system. In a first embodiment, the modular assembly includes a motor, gear train, electric sensors, throttle shaft, throttle shaft bearings, throttle valve plate, and housing. All of these components, except for the throttle shaft, motor and bearings are made of a plastic material. A two-piece “clamshell” airflow passageway member is installed over the throttle plate and throttle shaft, thus allowing for variations and changes of components and passageway configurations as necessary. A throttle shaft bearing in the module housing aligns the gear train within the housing. Bearings on the throttle shaft mate with recesses in the two-piece clamshell member. The mating clamshell halves include face sealing ledges on the internal surface which allow the throttle valve plate to rest when the throttle is in the closed position.

In another embodiment, the module includes the motor, gear train, electrical sensors, and housing member. A second modular component includes a throttle shaft, throttle valve plate and throttle bearings positioned in a two-piece clamshell member. A coupling on the end of the throttle shaft mates with the gear train in the housing, thus allowing the throttle plate to rotate as desired.

These and other objects, features, and benefits of the present invention will become apparent from the following description of the invention, when taken in view of the attached drawings and appended claims.

DESCRIPTION OF THE PREFERRED EMBODIMENT(S)

Figure 1:
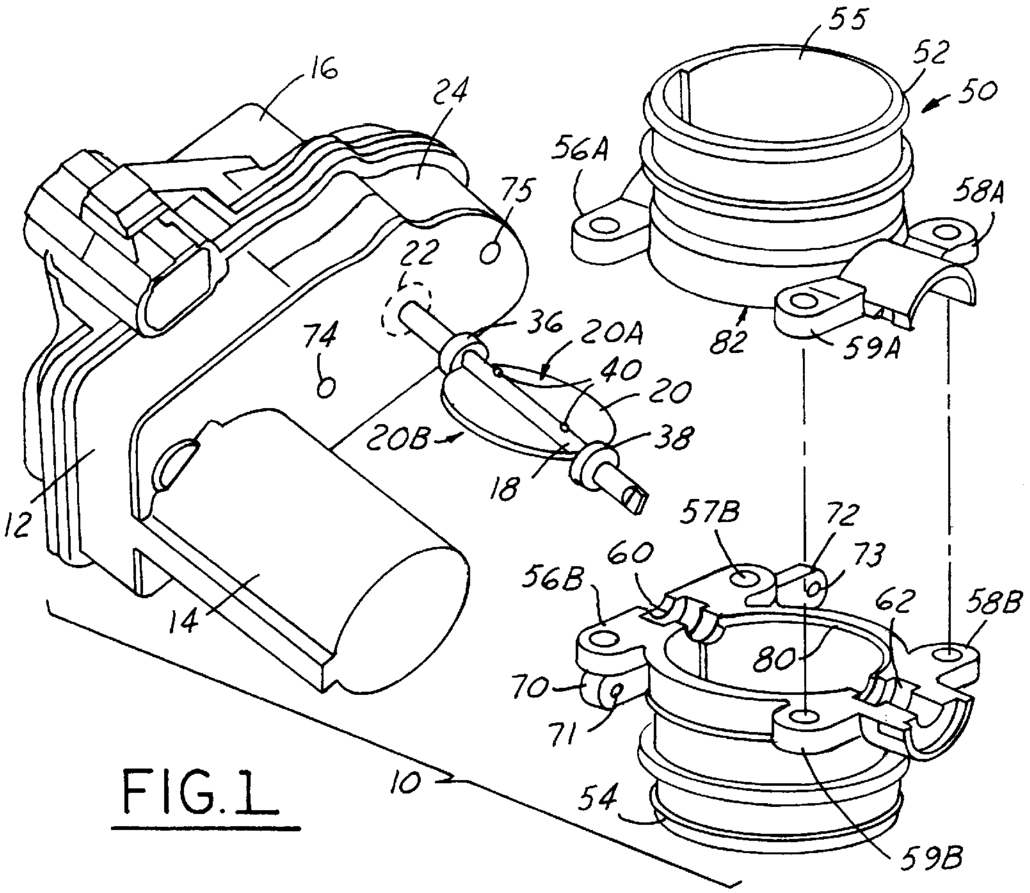
FIG. 1 is an exploded view of a throttle valve assembly in accordance with the present invention.
Figure 4:
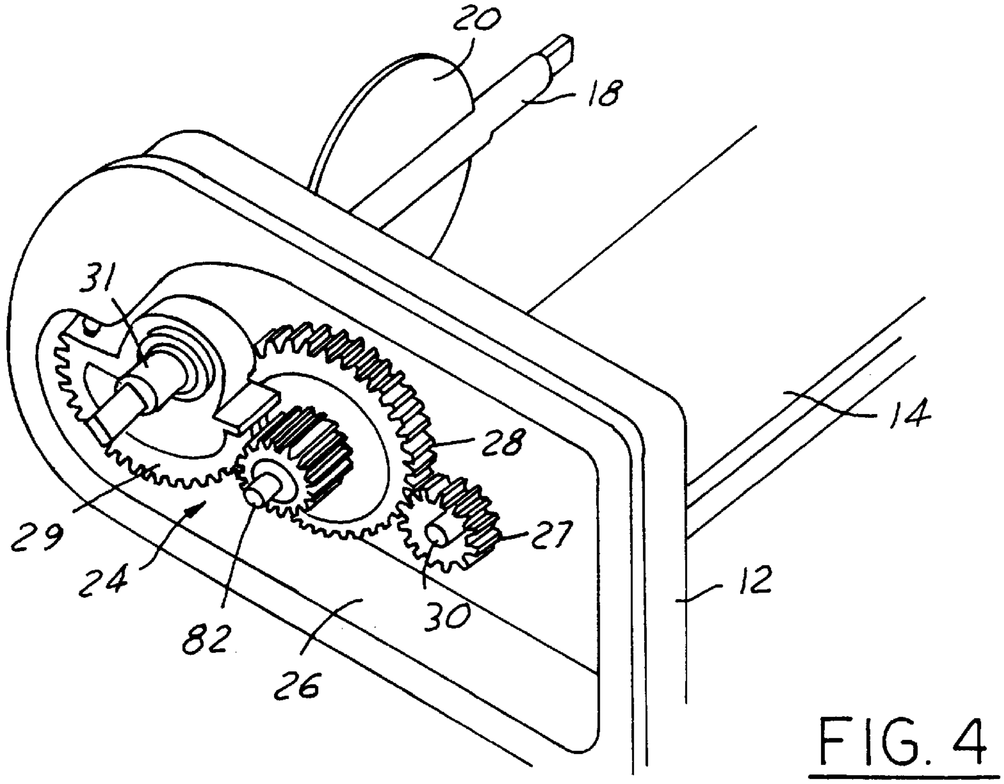
FIG. 4 is a partial view of the throttle valve assembly depicting the gear train.

One embodiment of the present invention is depicted in exploded view in FIG. 1 and referred to by the reference numeral 10. The electronic throttle valve assembly module 10 includes a housing member 12, a motor 14, electric sensors 16, a throttle shaft 18, a throttle valve plate 20, and a throttle shaft main bearing 22. The throttle valve assembly 10 also includes a gear train 24 which is positioned inside a cavity or recess 26 in the housing member 12 (see FIG. 4). During operation of the throttle valve assembly, electronic signals sent to the motor 14 operate the position of the throttle valve plate 20 through the gear train 24. The gear train 24 includes a number of gear members, such as gear members 27, 28, and 29. Gear member 27 is attached to the motor shaft 30 and is meshed with intermediate gear 28 which, in turn, meshes with and operates sector gear member 29, which is attached to the end 31 of the throttle shaft 18.

Electronic sensors 16 read the degree of rotation of the throttle shaft 18 and feed that information back to the electronic control module (ECM) (not shown) of the vehicle so that the throttle valve plate 20 is rotated or set to the appropriate desired position.

A pair of bearings 36 and 38 are mounted on the throttle shaft 18. The throttle valve plate 20 is attached to the throttle shaft 18 by fastener members 40 such as screws.

In this configuration, the module 10 is complete with all mechanical and electrical mechanisms and has the flexibility to be positioned in a variety of locations in the induction system of a vehicle. For a specific application, a portion of the induction system can be opened or “split” in order to mount the throttle valve assembly therein.

Figure 2:
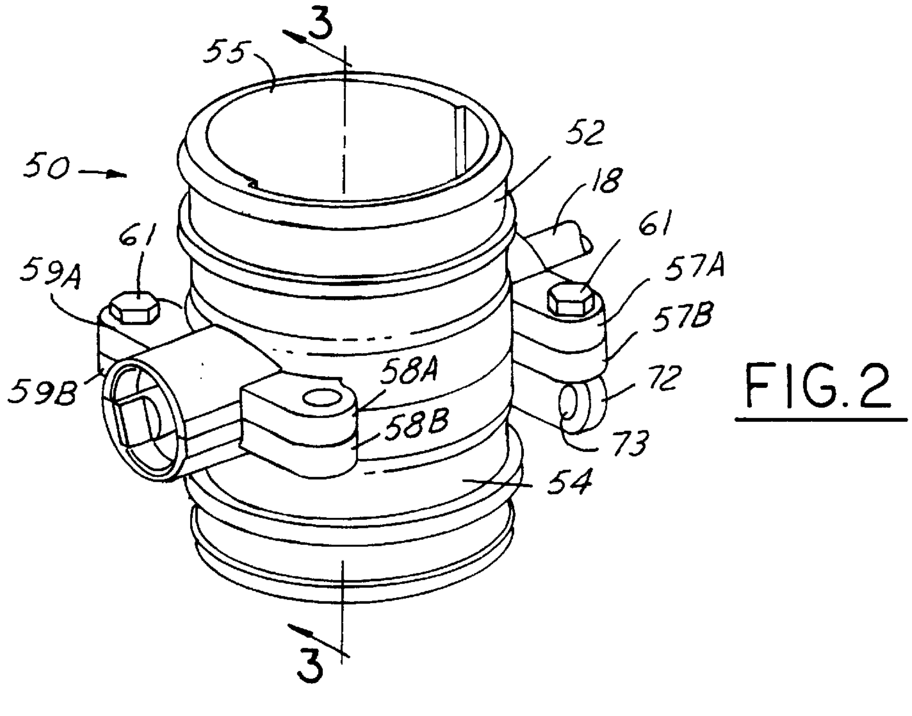
FIG. 2 is a schematic perspective view of a clamshell passageway housing member.
Figure 3:
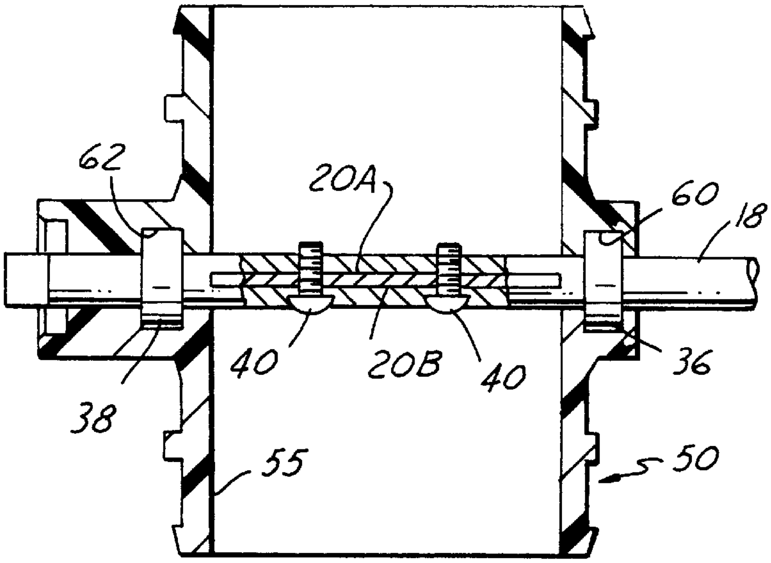
FIG. 3 is a cross-section of the two-piece clamshell member shown in FIG. 2, the cross-section being taken along lines 3—3 in FIG. 2.

For this purpose, a two-piece clamshell member 50 is provided. The clamshell member 50 has two halves, 52 and 54, which fit together around the throttle valve plate 20 and throttle shaft 18. In this regard, FIG. 2 is a perspective view of the clamshell members 52 and 54 when they are assembled together forming the clamshell member 50, while FIG. 3 is a cross-sectional view through the clamshell member 50 illustrating the position of the throttle shaft 18 therein.

Preferably, the two clamshell halves 52 and 54 are identical and formed so that they can be assembled easily over the throttle shaft 18 and enclose the throttle valve plate 20. For this purpose, the clamshell halves 52 and 54 have a plurality of mating flange members 56A–56B, 57A–57B, 58A–58B, and 59A–59B. The mating flange members each have mating openings therein so that the two clamshell halves 52 and 54 can be secured together around the throttle shaft 18 by appropriate fasteners, such as screws, bolts, or other conventional members 61.

The clamshell halves 52 and 54 have circular recesses or grooves 60 and 62 for mating with the bearing members 36 and 38, respectively. When the two clamshell halves 52 and 54 are fastened together, the bearings 36 and 38 set the alignment of the throttle valve plate 20 in the central passageway 55. In this regard, the modular assembly 10 “floats” relative to the clamshell member 50 so that binding is not created during fastening and subsequent clamping of the halves 52 and 54.

After the two halves 52 and 54 are secured together around the throttle shaft 18, the clamshell member 50 is fastened to the modular assembly 10. For this purpose, flange members 70 and 72 are provided on one or both of the clamshell members 52, 54. Conventional screws, bolts, or other fasteners are then inserted through openings 71 and 72 in the flange members 70 and 72 and secured in corresponding openings 74 and 75 in the housing member 12.

Each of the clamshell members 52 and 54 have face sealing ledges 80 and 82 on the internal surfaces in the passageway 55. Face sealing ledges 80 and 82 tangentially extend approximately 180° about the internal surface of the passageway 55, beginning and ending near the axis of rotation of the throttle shaft 18. When the halves 52 and 54 are mated, the resultant sealing ledges are in a coaxial opposed position and contained within parallel planes. The distance between the parallel planes is defined by the approximate thickness of the throttle valve plate 20.

The throttle valve plate 20 has an upper surface 20A and a lower surface 20B. 180° of the peripheral edge of the upper surface 20A rests on face sealing ledge 80 and approximately 180° of the peripheral edge of the lower surface 20B rests on sealing ledge 82 when the throttle plate 20 is in the closed position.

As is conventional with throttle body assemblies, the throttle valve plate 20 pivots from a closed position and rotates approximately 90° to a fully open (or wide-open throttle) position. In the full open position, the throttle valve plate 20 is positioned approximately parallel with the air flow through the passageway 55.

Further aspects and details of the operation of the throttle valve plate 20 and its relationship to the face sealing ledges 80 and 82 is contained in U.S. Pat. No. 5,979,871, the disclosure of which is hereby incorporated by reference herein. U.S. Pat. No. 5,979,871 is co-owned with the present invention.

Figure 5:
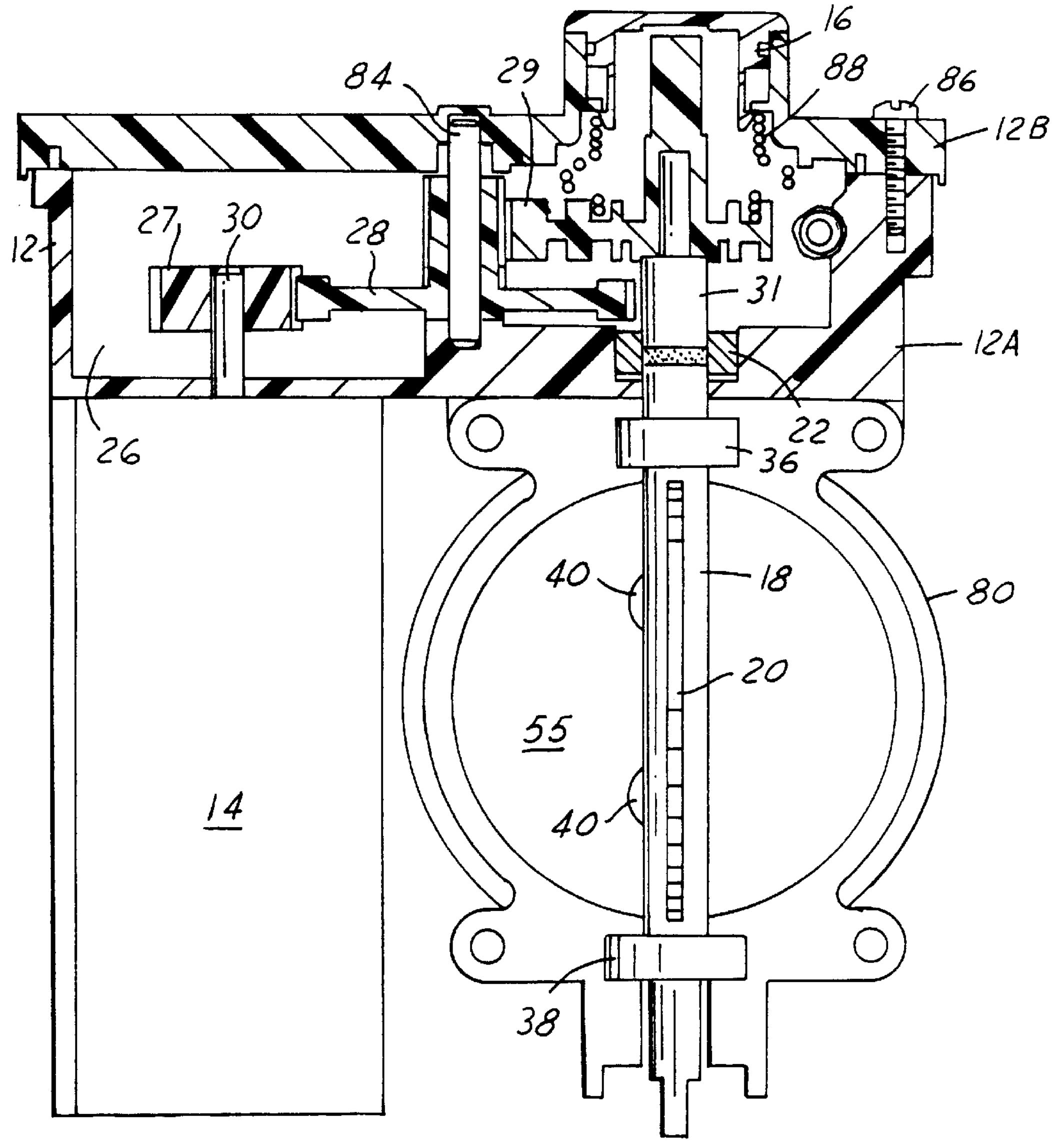
FIG. 5 is a cross-sectional view with the assembly in an assembly configuration.

A cross-sectional view showing the assembly of the module 10 and the clamshell member 50 is shown in FIG. 5. The intermediate gear 28 rotates around stationary shaft member 84 which is positioned in the housing 12. The housing 12 has a base member 12A and a cover member

12B, the two members being held securely together by bolts 86 or other conventional fasteners. The upper end 31 of the throttle shaft 18 is affixed to the sector gear 29 and rotates with it. Preferably, the end 31 is molded into the sector gear 29. A coil spring member 88 which is secured at one end of the housing 12 and at the other end to the sector gear 29 biases the throttle plate toward the closed condition. In this manner, if the electronic throttle control mechanism or electronic system in the vehicle were to fail, the throttle plate would be returned to its closed condition. At this point, in order to allow the operator to “limp home,” the valve plate is rotated to a small open position by a default mechanism. There are several types of conventional default mechanisms which can be utilized with the present invention.

It is also possible for the two clamshell members 52 and 54 to be secured together in any other conventional manner, such as a “snap fit” interacting mechanism (not shown). A “snap together” connection would simplify assembly of the electronic throttle valve assembly. It is also possible for the throttle shaft 18 and throttle valve plate 20 to be made from a plastic material. Also, the bearings 36 and 38 can comprise anti-friction bearings, or bushings, as desired.

Figure 6:
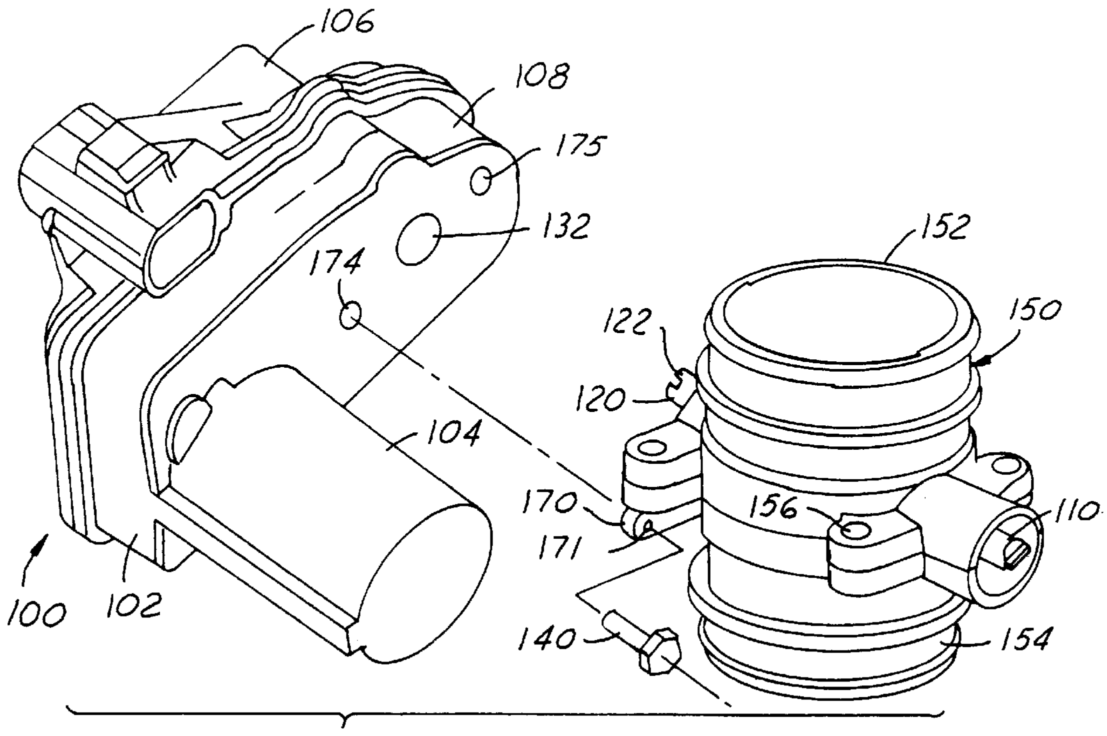
FIG. 6 is an exploded view of an alternate embodiment of the present invention.
Figure 7:
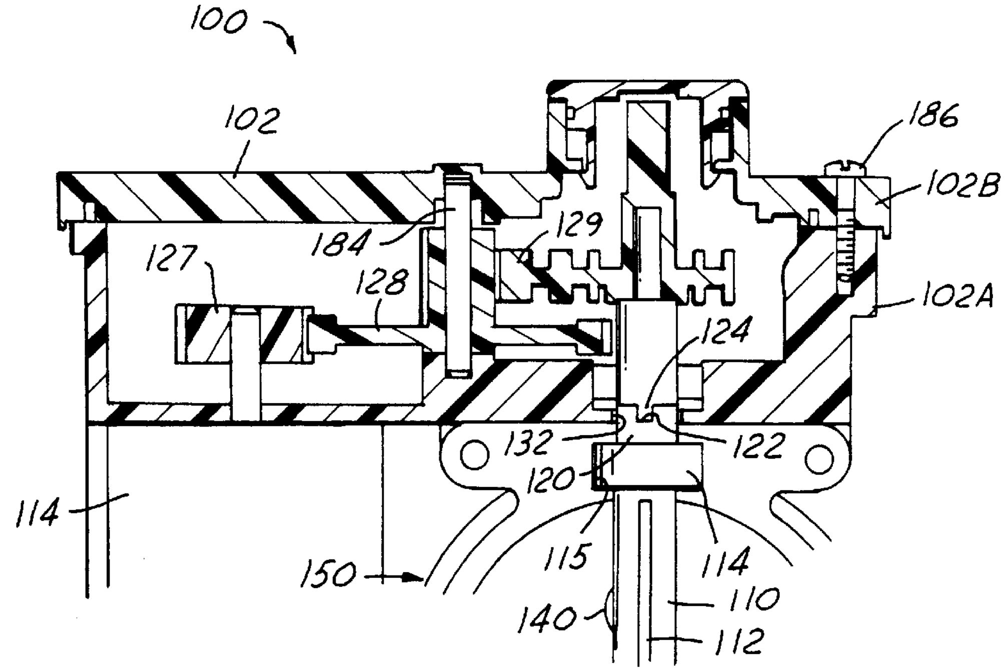
FIG. 7 illustrates in cross-section, the mating of the two sub-modules forming the alternative embodiment.

A second embodiment of the invention is shown in FIGS. 6 and 7. In this embodiment, the modular electronic throttle valve assembly is referred to by the reference numeral 100 and the clamshell member is referred to by the reference numeral 150. The modular housing 100 is made from a plastic material and includes a housing 102, a motor 104, electronic sensors 106, and a gear train mechanism 108.

The clamshell member 150 has the throttle shaft 110 and throttle valve plate 112 previously positioned in it as a subassembly. Bearing members 114 and 116 (not shown) are positioned in mating recesses or grooves 115 and 117 (not shown), respectively. The two clamshell members 152 and 154 are connected together by a plurality of fastener members, such as bolts, screws, or other conventional fastener members. A coupling 120 is provided at one end of the throttle shaft 110. The coupling 120 can be of any conventional design, and is shown as slot or groove 122. The groove 122 mates with a corresponding rib member 124 positioned in the gear train 130 in the housing member 102. The coupling 120 is positioned through opening 132 in the housing member 102.

In order to secure the clamshell member 150 to the module 100, a plurality of conventional fastener members, such as bolts 140 are utilized. The bolts 140 are positioned through openings 171 and 173 (not shown) in flanges 170 and 172 (not shown) and secured in threaded openings 174 and 175 in the housing 102.

Figure 8:
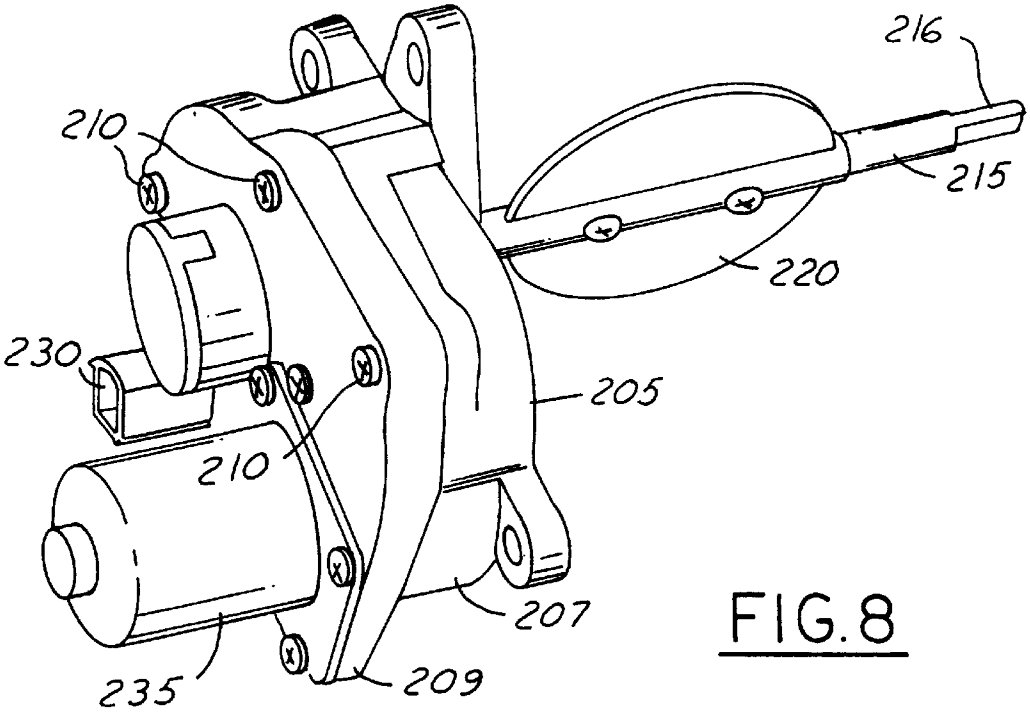
FIG. 8 illustrates still another embodiment of the invention.

A further embodiment of the invention is shown in FIG. 8. The module 200 includes a housing 205 which has a base member 207 and a cover member 209. A plurality of conventional fasteners, such as screws 210 secure the two components of the housing together. A gear train (not shown) is positioned in the housing 205 and operates the throttle shaft 215 and throttle plate 220. An electronic position sensor (not shown) is positioned on the end 216 of the throttle shaft 215. The connection from the housing to the ECU of the vehicle is made through electronic connector 230.

In this embodiment, as opposed to the embodiments discussed above and set forth in FIGS. 1–7, the motor housing 235 (and motor—not shown) is positioned on the housing 205 on the opposite side from the throttle shaft and throttle plate. This can be done by packaging considerations. Also, the electronic position sensor is positioned adjacent the opposite end of the throttle shaft.

A two-piece clamshell member (not shown) similar to clamshell member 50 described above and shown in FIGS. 1–3 is assembled around the throttle plate and connected to the housing in a similar manner to that described above.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A throttle valve assembly for use in an internal combustion engine, comprising:

a throttle housing subassembly including a housing member, a motor, at least one electronic sensor, and a gear train mechanism, said gear train mechanism being positioned in said housing member, said housing member having an opening for positioning of a first end of a throttle shaft member, and said gear train mechanism having a first mating mechanism for connection to the first end of the throttle shaft member; and a throttle mechanism subassembly including a throttle shaft member, a throttle plate positioned on said throttle shaft member, and a two-piece clamshell member forming an air passageway conduit and positioned around said throttle plate, said throttle shaft member having a first end protruding from a first side of said clamshell member and having a second mating mechanism thereon for mating with said first mating mechanism on said gear train mechanism;

said first and second mating mechanisms being male and female mating members;

wherein said throttle mechanism subassembly and said throttle housing assembly are assembled together by placement of said first end of said throttle shaft member in said opening in said housing member and by mating together said first and second mating mechanisms thereby forming said complete throttle valve assembly.

2. The throttle valve assembly as set forth in claim 1 wherein said throttle shaft member has a second end protruding from a second side of said clamshell member opposite to said first side, wherein said second end is adapted to be connected to an electronic position sensor.

3. The throttle valve assembly as set forth in claim 1 further comprising a pair of bearing members on said throttle shaft member, said bearing members being supported by corresponding cavities in said two-piece clamshell member.

4. The throttle valve assembly as set forth in claim 1 wherein said second mating mechanism comprises a groove member and said first mating mechanism comprises a rib member.

5. The throttle valve assembly as set forth in claim 1 further comprising fastening means to fixedly attach said throttle mechanism subassembly to said throttle housing subassembly.

6. The throttle valve assembly as set forth in claim 5 wherein said fastening means comprises fastening flanges on said clamshell member and fastening members.

7. The throttle valve assembly as set forth in claim 1 wherein at least said housing member, gear train mechanism and clamshell member are made from a plastic material.

* * * * *